No. 895,230. PATENTED AUG. 4, .08.
A. BEIER.
LAND ROLLER.
APPLICATION FILED APR. 6, 1908.

Witnesses
Clarence E. Day
Alicia Townsend

Inventor
August Beier
Parker & Burton
Attorneys

UNITED STATES PATENT OFFICE.

AUGUST BEIER, OF DETROIT, MICHIGAN.

LAND-ROLLER.

No. 895,230.  Specification of Letters Patent.  Patented Aug. 4, 1908.

Application filed April 6, 1908. Serial No. 425,292.

*To all whom it may concern:*

Be it known that I, AUGUST BEIER, a citizen of the United States, residing at Detroit, county of Wayne, State of Michigan, have invented a certain new and useful Improvement in Land-Rollers, and declare the following to be a full, clear, and exact description of the same, such as will enable others skilled in the art to which it pertains to make and use the same, reference being had to the accompanying drawings, which form a part of this specification.

This invention relates to land rollers and clod breakers.

It has for its object an improved construction of roller provided with projecting teeth which are arranged in ranks along the surface of the roller; any one of the teeth can be easily and readily removed and replaced if for any reason it is desired to do so, or an entire rank of teeth may be removed if that be desired, and the arrangement produces a very strong, compact and durable roller, easily and economically constructed, easily kept in order, and very efficient in action.

Figure 1:
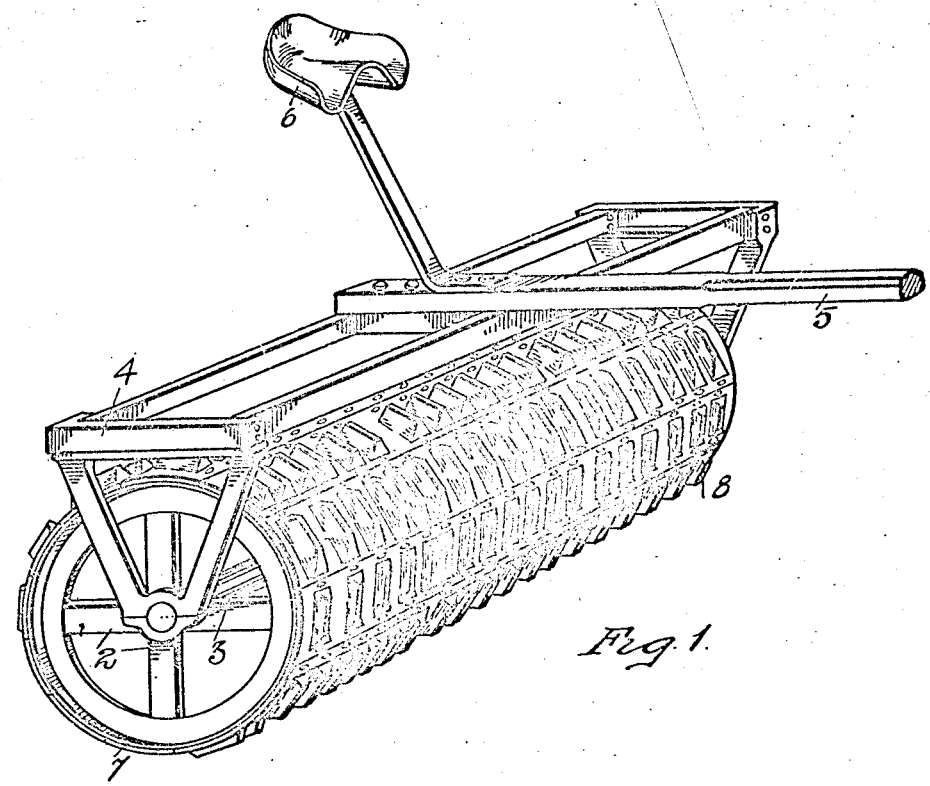
Figures 2, 3:
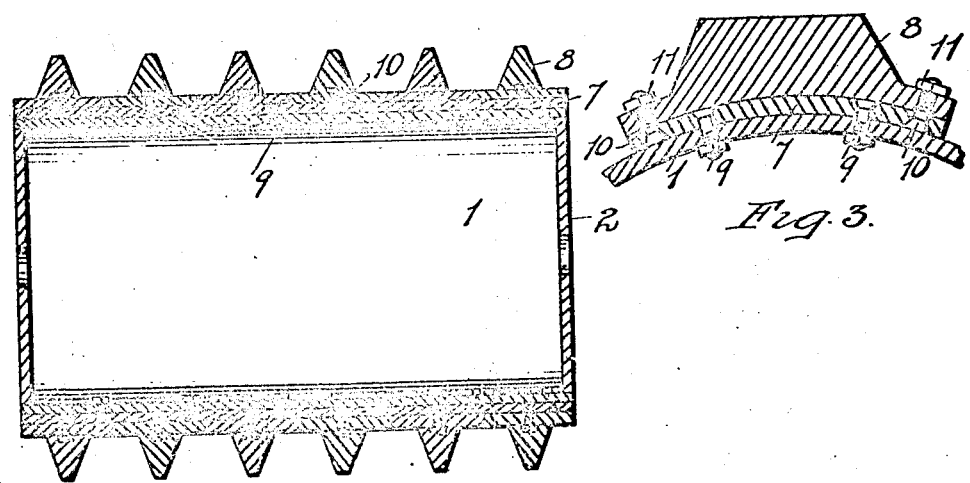

In the drawings:—Figure 1, is a perspective of the assembled roller. Fig. 2, is a longitudinal section. Fig. 3, is a detail of a single tooth.

The body of the roller 1 is preferably made from heavy sheet iron or boiler iron, mounted on spoke-like supports 2 on an axle 3, and preferably supporting a frame 4, from which the pole 5 projects forward, and a seat 6 for the rider rises. The frame 4 may be utilized as a receptacle for the carriage of any weighty material if desired. On the body 1 of each section there are bolted longitudinal plates 7, each of which carries a plurality of teeth 8. The plates are secured to the body of the roller by bolts which preferably are inserted from the outside through the plate 7, through the body 1, and are secured by nuts 9 run onto the bolts from the inner end. Upon these plates are secured the individual teeth 8, each of which is provided at its ends with bolt holes through which are passed bolts 10, preferably passing from the inside out, and the teeth are secured by nuts 11 run onto the bolts. The plate 7 is provided at each bolt hole with countersunk holes; those which hold the plates to the body of the roller, being countersunk on the outside, or convex side of the plate, and those for the bolts which secure the teeth to the plate, being countersunk on the inside, or concave side of the plate. The plate thus fits closely upon the body of the roller, and the teeth fit closely upon the plate, and all the bolt heads are covered and all bolts are held in place even though the nuts may be loosened or lost; any single tooth may be detached from the plate by removing the nuts 11, and any plate may be removed from the main body by removing the nuts 9. Preferably the completed roller is made in sections in the ordinary way in order that in turning corners one section may travel at a different rate of speed from another section, and facilitate the handling of the roller in the field.

What I claim is:—

In a land roller, in combination with a tubular body member, a plate engaging along said body member, bolts securing said plate to the body member and having their head ends on the outside of said plate and their threaded ends on the inside of said body member, a plurality of individual teeth secured to said plate, the bolts securing said teeth to said plate having their head ends on the inside of said plate and their threaded ends on the outside, whereby the heads of all securing bolts are covered, substantially as and for the purpose set forth.

In testimony whereof, I sign this specification in the presence of two witnesses.

AUGUST BEIER.

Witnesses:
  WILLIAM LOOK,
  EUGENE E. LOOK.